United States Patent [19]

Gold et al.

[11] Patent Number: 4,874,951
[45] Date of Patent: Oct. 17, 1989

[54] SOLID-STATE TRACK RECORDER DOSIMETRY DEVICE TO MEASURE ABSOLUTE REACTION RATES AND NEUTRON FLUENCE AS A FUNCTION OF TIME

[76] Inventors: Raymond Gold; James H. Roberts, both of 1393 George Washington Way, Suite No. 7, P.O. Box 944, Richland, Wash. 99352

[21] Appl. No.: 72,776

[22] Filed: Jul. 13, 1987

[51] Int. Cl.$^4$ ............................ G01T 5/00; G01T 1/02
[52] U.S. Cl. .................. 250/472.1; 250/267; 250/482.1
[58] Field of Search .................. 250/267, 482.1, 475.2, 250/473.1, 472.1, 390 I, 390 B

[56] References Cited

U.S. PATENT DOCUMENTS

| | | | |
|---|---|---|---|
| 2,714,170 | 7/1955 | Bloch | 250/251 |
| 3,182,219 | 5/1965 | Thomas | 250/390 |
| 3,209,148 | 9/1965 | Pavry et al. | 250/474.1 |
| 3,493,749 | 2/1970 | Olson | 250/328 |
| 3,688,114 | 8/1972 | Youmans | 250/267 |
| 3,932,752 | 1/1976 | Aday, Jr. et al. | 250/328 |
| 4,228,350 | 10/1980 | Paap et al. | 250/267 |

FOREIGN PATENT DOCUMENTS 165678 7/1986 Japan ............................ 250/390 I Primary Examiner—Constantine Hannaher
Attorney, Agent, or Firm—Keith S. Bergman

[57] ABSTRACT

A solid state track recording type dosimeter is disclosed to measure the time dependence of the absolute fission rates of nuclides or neutron fluence over a period of time. In a primary species an inner recording drum is rotatably contained within an exterior housing drum that defines a series of collimating slit apertures overlying windows defined in the stationary drum through which radiation can enter. Film type solid state track recorders are positioned circumferentially about the surface of the internal recording drum to record such radiation or its secondary products during relative rotation of the two elements. In another species both the recording element and the aperture element assume the configuration of adjacent disks. Based on slit size of apertures and relative rotational velocity of the inner drum, radiation parameters within a test area may be measured as a function of time and spectra deduced therefrom.

18 Claims, 3 Drawing Sheets

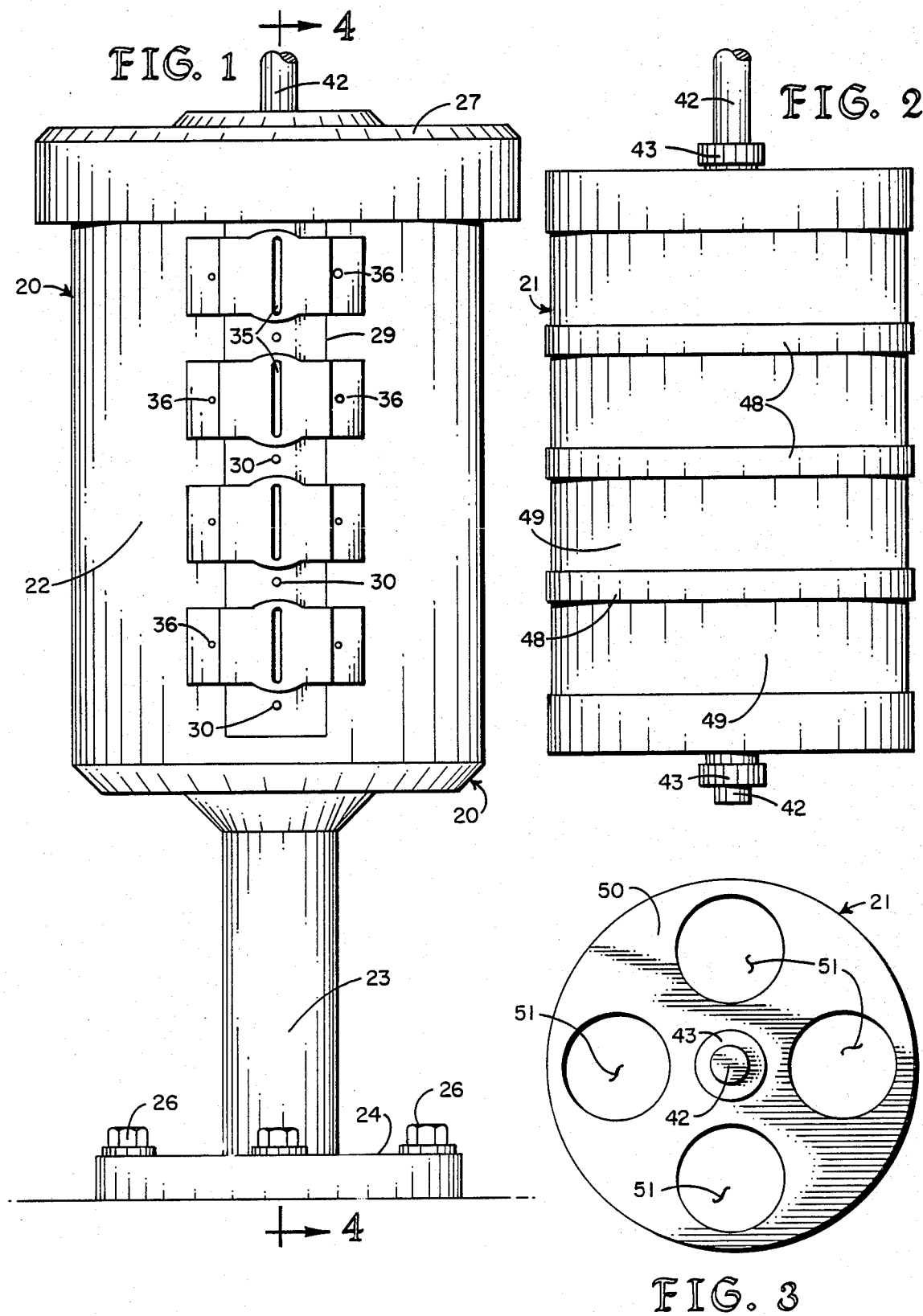

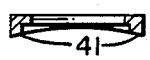
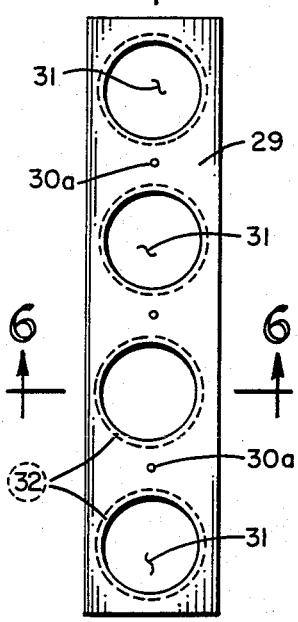
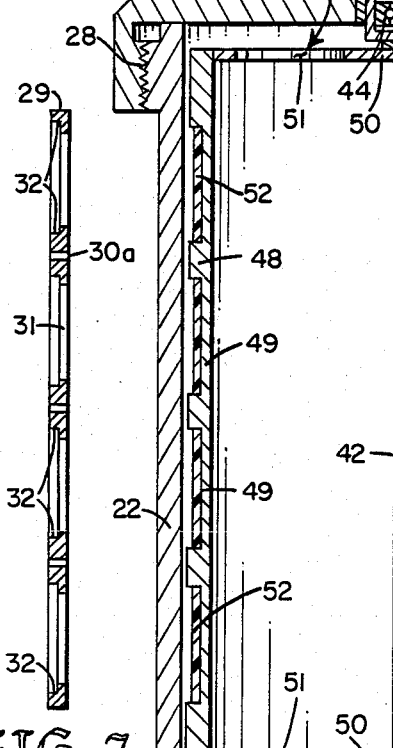
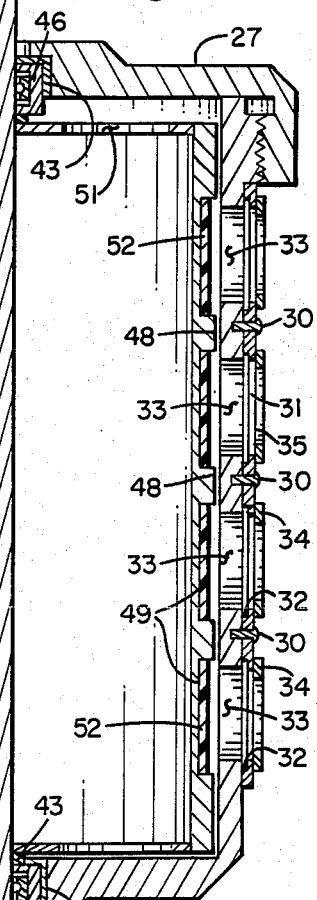
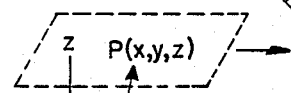
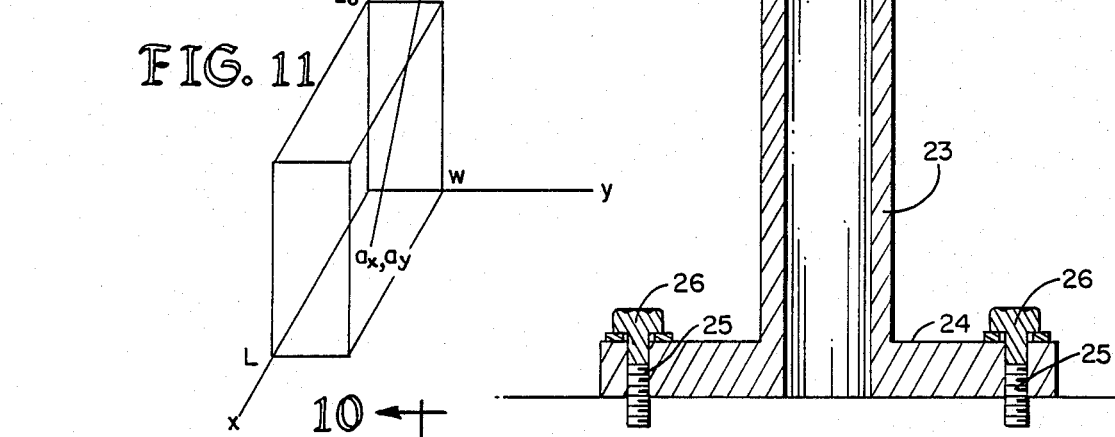
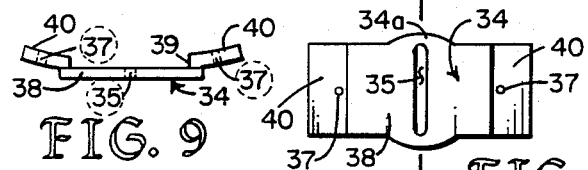
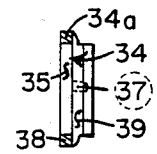

SOLID-STATE TRACK RECORDER DOSIMETRY DEVICE TO MEASURE ABSOLUTE REACTION RATES AND NEUTRON FLUENCE AS A FUNCTION OF TIME

BACKGROUND OF INVENTION

Related Applications

There are no applications for patent relating hereto heretofore filed in this or any foreign country.

1. Field of Invention

Our invention relates generally to solid state track recorders to measure radiation spectra and particularly to such recorders that measure time orientation of radiation.

2. Description of Prior Art

The nuclear arts, especially in their application to reactor environments, have required the development of neutron dosimeters to provide sensitive and accurate means of quantifying high fluence neutron radiation. In years past, neutron dosimetry has been carried out with radiometric dosimeters (RM), helium accumulation fluence monitors (HAFM), and, especially with the advent of automated scanning systems, with solid state track recorders (SSTR). The SSTR neutron dosimeters have become comparable in cost with RM and HAFM devices and have advantages over either of the later devices in neutron dosimetry.

SSTR dosimeters require less sensor material than RM dosimeters. Sensor material of the RM devices must be of high purity and usually involves use of U-238 or Np-237, both which are of limited supply and high cost. In fact RM devices could deplete the world supply of their sensor materials in commercial application if such dosimeters were exclusively used.

SSTR dosimeters are capable of higher efficiency then other dosimeters and are in fact sensitive enough to permit surveillance dosimetry on the exterior of a nuclear pressure vessel in a reactor cavity formed between the pressure vessel and its requisite biological shield. SSTR's also have lower radioactivity characteristics than the RM devices to provide reduction of personnel radiation exposure as well as simplified shipping and handling. Of particular advantage in this detection system is the microscopic spatial resolution afforded by SSTR neutron dosimetry.

All of the noted neutron dosimeters have been utilized for the surveillance of nuclear pressure vessels utilized in the nuclear power industry to ascertain neutron activity therein or thereabout. This surveillance is desirable in determining the deleterious effect of neutron particles on a pressure vessel, as metalurgical embrittlement will occur after exposure for a period of time and accordingly such risks need to be evaluated in light of the information thusly gathered. Neutron induced pressure vessel embrittlement has been recognized as a serious problem for many years and need has steadily grown to determine neutron activity about reactor pressure vessels to aid in evaluating the safety and useful life of a vessel. Such data is also useful in evaluating and possibly modifying equipment, systems, and procedures to accommodate measured neutron activity.

Our systems possess advantages for power reactors cavities, the cavity being the annular region between the pressure vessel and the surrounding biological shield. Use of our system in a reactor cavity would determine the time dependence of pressure vessel neutron exposure on a daily or finer basis. This time dependence can be significant especially for low leakage cores that are used by nuclear power utilities. At the same time, our system utilizes SSTR fission deposits that are easy to fabricate and quantify, since these deposits are almost 10,000 times more massive than the ultra low level SSTR deposits normally produced for surveillance dosimetry in power reactor cavities. In fact, recent efforts make ultra low level actinide SSTR deposits for cavity surveillance dosimetry reveal serious unresolved problems in background contamination and non-uniformity.

The advent of present day burst type fusion reactors has presented a new set of problems in this area. The fusion reactor creates intense radiation bursts, at the present time of necessarily limited time duration. Normal passive detection systems are not easily applied to the measurement of these high intensity radiation bursts in the limited time available. Our detection system has been developed particularly to overcome deficiencies of the past in monitoring and measuring the time dependence of neutron intensity in such burst type radiation fields.

We provide two relatively rotatable elements, the first defining axially spaced openings which may optionally support a series of threshold fission sources to be activated by incoming neutron flux to be measured. The second element views the fission sources and supports appropriate recording material to record evidence of neutron interactions therein. The point where fission fragment tracks being on the recording material determines the start of a neutron burst to be recorded, and if the relative rotational speed of the elements is appropriate, the time interval of a burst's duration can be tracked to its end on the recording media. This reaction orientates the entire track record in time and provides means by which time-dependent neutron intensity and absolution neutron fluence spectra may be deduced by appropriate calculation.

Prior art devices generally have measured the neutron flux, but have not recorded the time-dependence as found, for example, in burst fusion reactors. Our invention differs from the prior art in this regard, though its differences are not limited only to this feature, but rather resides in the synergistic combination of all of its elements that provide the functions necessarily flowing therefrom.

SUMMARY OF INVENTION

A first species of our invention provides rotating recorder cylinder journaled within a stationary collimator cylinder. A base supports an upright pedestal carrying the external stationary collimator cylinder thereabove. The stationary cylinder has a removable lid to define an internal chamber containing the rotatable recorder cylinder. Formed about the surface of the rotatable cylinder are a series of circumferential recessed support bands configured to accept strips of solid state track recording material suitable for recording fission fragment tracks. Spaced, on the stationary cylinder in overlying relationship to the rotating cylinder's track recording material support bands, is a series of axially spaced and aligned collimator slits allowing entry of fission fragments or charged particles which are to be recorded. Secured to the surface of the stationary cylinder, radially inwardly adjacent the collimator slits and outwardly of the recording material, is a series of openings enabling the securement therein of fission sources to be activated by the incoming neutrons to provide measurable evidence of neutron activity.

A second species of our invention provides recording and collimator elements in the form of adjacent relatively rotatable disks. One disk carries recording material on at least one annulus on its surface adjacent the second disk and the second disk defines collimator structure overlying the recording material.

In creating such devices, it is:

A principal object of our invention to create a rotating dosimeter that determines neutron intensity in burst-type radiation fields, such as in fusion reactors, by providing a time orientated measurement thereof.

A further object of our invention to provide such a dosimeter with a first member defining apertures to allow impingement of radiation upon a second member movable relative to the first member and carrying means for measuring that impinging radiation.

A further object of our invention to provide such a rotatable dosimeter that measures neutron radiation by means of solid state track recording material associated with the apertures and overlying the recording material.

Another object of our invention to provide such a rotating dosimeter that measures neutron activity by means of a series of portals mounting SSTR's with fission material having varying neutron energy threshold levels to thereby allow determination of neutron energy spectra.

A further object of our invention to provide such a rotating dosimeter that by reason of its motion allows determination of real time orientation of neutron intensity and neutron spectra.

A still further object of our invention to provide such a device that is of new and novel design, of rugged and durable nature, of simple and economic manufacture and one otherwise well suited to the uses and purposes for which it is intended.

Other and further objects of our invention will appear from the following specification and accompanying drawings which form a part hereof. In carrying out the objects of our invention, however, it is to be understood that its essential features are susceptible of change in design and structural arrangement with only one practical and preferred embodiment being illustrated and described in the accompanying drawings and specification, as is required.

BRIEF DESCRIPTION OF DRAWINGS

In the accompanying drawings which form a part hereof and wherein like numbers of references refer to similar parts throughout;

FIG. 1 is an orthographic side view of our invention, illustrating a collimator mounted on a stationary housing cylinder.

FIG. 2 is an orthographic side view of a rotating recording cylinder that is removed from its normal journaled position within the stationary cylinder of FIG. 1.

FIG. 3 is an orthographic top view of the recording cylinder of FIG. 2.

FIG. 4 is a vertical cross-sectional view of the device of FIG. 1, taken on the line 4—4 thereon in the direction indicated by the arrows.

FIG. 5 is an orthographic side view of an aperture plate of our invention.

FIG. 6 is a horizontal cross-sectional view of the aperture plate of FIG. 5, taken on the line 6—6 thereon in the direction indicated by the arrows.

FIG. 7 is a vertical cross-sectional view of the aperture plate of FIG. 5, taken along line 7—7 thereon in the direction indicated by the arrows.

FIG. 8 is an orthographic surface view of a slit collimator element as utilized with the present invention.

FIG. 9 is an orthographic end view of the slit collimator element of FIG. 8.

FIG. 10 is a cross-sectional view of the slit collimator element of FIG. 8, taken on the line 10—10 thereon in the direction indicated by the arrows.

FIG. 11 is a diagramatic illustration of collimator geometry as it relates to mathematical analysis of radiation pathways therethrough.

DESCRIPTION OF THE PREFERRED EMBODIMENT

Figure 12:
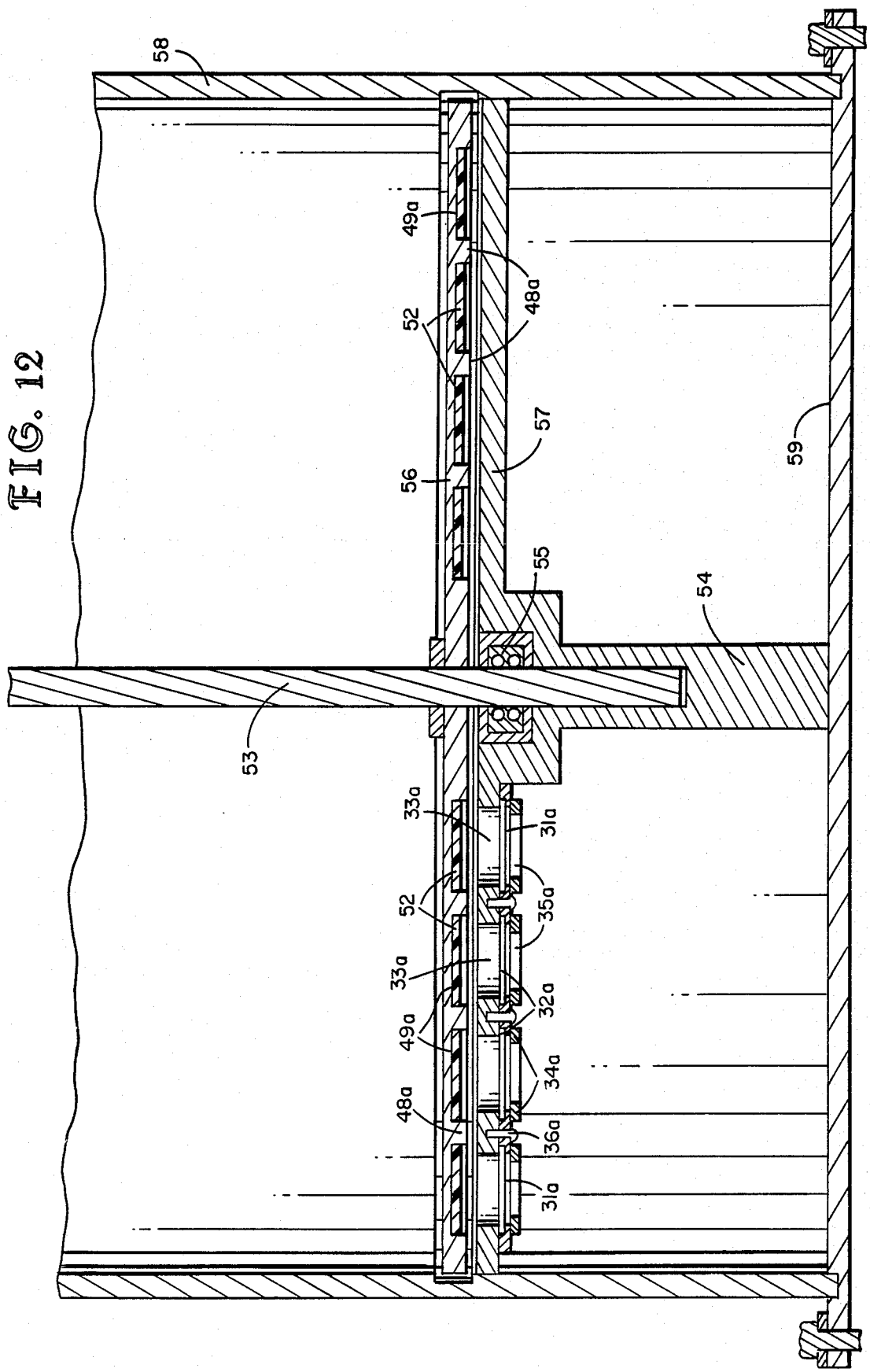
FIG. 12 is a medical vertical cross-sectional view of a second species of our invention illustrating its embodiment in relatively rotatable disks.

The first species of our invention comprises, generally, stationary housing cylinder 20 defining an array of apertures overlaid by slit collimators and internally carrying rotating recording cylinder 21 mounting solid state track recording material to record evidence of neutron interactions in a detection area.

Stationary housing cylinder 20 provides peripherally defined cylinder 22 secured to stanchion 23 integrally attached to base plate 24 for support. For convenience cylinder 22 and base plate 24 are illustrated as a unitary structure, but in fact these structures may be formed of separate structures mechanically joined by common techniques such as welding or bonding, for example. Base plate 24 defines a plurality of apertures 25 to accept threaded fasteners 26 passing therethrough to secure the base plate to a convenient horizontal supporting surface for stability. Cylinder 22 is capped at its upper end by cover 27 releasably secured to cylinder 22 by conventional means such as threads 28, to securedly affix the cover to the cylinder but yet allow removal for access to the interior of the housing.

FIGS. 1 and 4 illustrate the attachment of positioning plate 29 exteriorly of cylinder 22 by fasteners 30 passing through holes 30a in the positioning plate. Positioning plate 29 in this instance defines four portals 31 to coincide and align with the same number of cooperating tracking strips, stationary cylinder openings 33, and collimator slit openings 35. As illustrated in FIG. 4, positioning plate 29 when secured to the cylinder 22 defines chambers between the positioning plate, inner cylindrical 32 and cylinder 22 under each portal 31. The so-formed chambers provide a convenient area and means to secure a threshold fission source within said chamber. Such a fission source would typically be in the form of a circular disk of material of a like diameter as defined by the inner surface of cylindrical rim 32.

As illustrated in FIGS. 1 and 4, collimator plates 34 defining collimator slits 35 are attached to stationary cylinder 22. Conventional fasteners 36 passing through holes 37 defined in collimator plates 34, or equivalent attachment mean, are utilized for this purpose. The collimator plates are positioned so that slits 35 are parallel to the axis of rotation of internal rotating cylinder 21 with a slit defined over, and its defining plate covering, each portal 31. FIG. 4 illustrates this desired alignment of collimator plates and slits and the relationship of positioning plate 29 to track recording material 52 supported by rotating cylinder 21.

FIGS. 8, 9 and 10 illustrate particular collimator plate configuration utilized by the instant invention. A medial stepped portion 38 is formed in collimator plates 34 to define shaped recess 39 so configured as to accept positioning plate 29 in a complementary manner therein. Collimator plates 34 are secured to cylinder 22 by fasteners 36 applied through apertures 37 formed on arcuately configured flanges 40 of the collimator plates to overlie the positioning plate, as illustrated. Collimator plates 34 have formed about their medial periphery, arcuately profiled sides 34a of an appropriate curvature to ensure coverage of portals 31 defined in positioning plate 29 by the collimator plates. Arcuately configured flanges 40 of the collimator plates, as well as feet 41 of the positioning plate, as illustrated in FIG. 6 are both formed with a curvature to substantially complement the outer peripheral contour of stationary cylinder 22.

Internal rotating recording cylinder 21 is irrotatably on supported axial shaft 42 which captures the cylinder between spaced collars 43 secured to the axial shaft in spaced relationship adjacent the rotating cylinder's end faces 50. Axial shaft 42 is journaled for rotation in opposed upper and lower bearings 44 and 45 that are nestably carried within upper and lower bearing recesses 46 and 47 defined in housing cover 27 and base portion 27a respectively. Accordingly, when cover 27 is secured to stationary cylinder 20, bearing recess 46 formed therein, cooperating with the associated structures, securedly and accurately positions the rotating cylinder within the stationary cylinder, with appropriate predetermined clearances established between the two cylinders.

The rotating cylinder's vertical arcuate peripheral surface is formed with a series of paired, horizontally orientated, circumferentially extending raised ribs 48 bounding recessed circumferential bands 49 defined therebetween. Recessed bands 49 are so positioned as to accept elongate strips of tracking material 52 therein to record fission fragments as a function of neutron intensity during the time the device is in use. Disk-like ends 50 that close the end portions of rotating cylinder 21 are formed with openings 51 to provide a reduction in inertial mass to thereby enable the rotating cylinder's change in motion to be more readily controlled.

The rotating cylinder is powered for rotation by a powering device (not shown) that is mechanically interconnected with axial shaft 42 externally of stationary housing 20. Preferably this powering device is an electric motor with control mechanism to allow adjustably determinable speeds of rotation. The powering means is not remarkable, is known in the prior art, and is therefore neither illustrated nor described in detail.

Polycarbonate plastic in sheet form is the track recording material of choice in our instant invention because of its inherent flexibility. Mica cleaved to a thickness of a few mils is also flexible enough to be mounted on the rotating cylinder surface. Other materials that have been utilized for track recording in the past, such as quartz, may be used but may not be readily formable or securable about the surface of the rotating cylinder.

FIG. 12 illustrates a second embodiment of our invention formed with two opposed relatively rotatable disks. Central axis 53 secured to center extension 54, and journaled in bearing assembly 55 rotatably mounts upper disk plate 56. Stationarily positioned thereunder is lower disk support plate 57 formed as an extended annular disk portion about a central hub. It is to be understood that while in this particular embodiment, upper disk plate 56 is presented as rotatable relative to a lower disk member, lower disk member 57 may be rotatably mounted relative to the upper disk plate, which in that case would preferably be stationary. If desired, both disks may be rotatably mounted relative to one another as long as means to predetermined relative velocity are provided. Support housing 58 is formed of a radioactively translucent material enabling flow of radiation therethrough and is itself secured to a base portion 59 which in turn may be secured by conventional fastening means to enable securement to a desired support (not shown). Radiation would normally enter this species from a source therebeneath.

As in the first embodiment, the collimator apparatus is comprised of collimator plate 34a defining collimator slits 35a and fastened to lower disk support 57. Portal openings 31a formed in collimeter plate 34a are positioned over inner cylindrical surfaces 32a for subsequent positioning of a threshhold fission material (not shown). Tracking material 52a is positioned within appropriate annular recesses 49a formed in an upper disk plate 56 between ridges 48a on the surface adjacent the other disk.

The operation of the instant invention may be understood in view of the foregoing description.

Referring to the first species of our invention in its assembled state, rotating cylinder 21, as viewed in FIG. 2, has polycarbonate track recording material 52, or its equivalent, positioned within recessed bands 49 circumferentially defined around the surface of the rotating cylinder. This material may be secured by adhesion or other known methods. The rotating cylinder is then loaded into stationary housing cylinder 20 with lower bearing 45 seated within its recess 47. Thereafter stationary cylinder cover 27 is engaged on the stationary cylinder housing to thereby seat bearing 43 in its recess 46 to align the respective cylinders. Positioning plate 29 has appropriate threshold fission material (not shown) positioned and secured within inner cylindrical chambers 32 and positioning plate is thereafter fastened onto stationary cylinder 20, as illustrated in FIGS. 1 and 4. Collimator plates 34 are secured over positioning plate portals 31 and fastened to the stationary cylinder. Our invention is then ready to measure time-dependent neutron intensity.

An appropriate predetermined angular speed is established in the rotating cylinder of our apparatus prior to monitoring of a radiation burst. Thereafter radiation may induce fission in the fission material whereby fission fragments generated thereby impinge on the track recording material through collimator slits 35.

The embodiment as illustrated in FIG. 12 is similarly assembled, prepared and utilized in the recording of neutron activity. Appropriate tracking material 52a is secured within annular recesses 49a of upper disk plate 56. Collimator plate 34a is fastened by means of fastener 36a to lower disk support plate 57 with appropriate positioning of threshhold fission material within inner cylindrical surface 32a. Accordingly after an appropriate predetermined angular speed is established between the two disks, as in the rotating cylinder embodiment, monitoring of radiation and measurement thereof by induced fission fragments is carried on in fashion similar to that described for the first embodiment.

The fission source responsively to impacting neutron radiation produces secondary measurable radiation that impacts upon the recording material to there produce tracks in that material in the traditional fashion of the prior art. These tracks may be etched by ordinary known methods to provide a sensible record of the secondary radiation activity created responsively to the primary radiation. Since the physical position of information on recording material is related in time to the orientation in time of the original causative radiation, the track record provides information from which original radiation time and intensity functions may be deduced. The quantity and nature of the original causative radiation may be deduced from the ultimate track record in the recording material by traditional mathematical and engineering methods heretofore known in the prior art.

The analysis of track records to determine radiation spectra oriented in time also may be variously accomplished by known methods. Normally only the relative time and intensity in a radiation burst is desired to be known, and if so, no real time orientation is required. If the real time orientation of a burst is desired, it is necessary only to establish a reference point on the recording indicating a determined point in real time to accomplish this end.

Having set forth the general operation of our invention, an operative embodiment with specific parameters and methods may be appreciated.

EXAMPLE 1

A detection system of the first species as described was built and operated utilizing a rotating cylinder 3.0 (7.62 cm.) inches in diameter and rotated at a speed of 3600 revolutions per minute. Four slits orientated parallel to the axis of rotation of the rotating cylinder were defined in the collimator elements. Slit widths of 0.5 millimeter and 0.2 millimeter were used. A relatively thin fission source material 0.25 inch (0.634 cm.) in diameter comprising 252-cf was utilized in contact with the inner surface of the collimator slits. The length of all collimator slits was 0.5 inch (1.27 cm.) and the thickness of all collimator plates was 0.100 inch (0.254 cm.), with the rotating cylinder positioned approximately 0.04 inch (0.1016 cm.) from the inner surface of a slit.

With this apparatus, a typical fission track distribution was obtained across the width of the slit. The distribution was approximately flat across the slit and falls off rapidly to zero at the edges because of the geometrical shadowing.

The collimator geometry relative to the recording surface was analyzed by known mathematical methods with reference to FIG. 11. This analysis provided results with the device described in the Example as set forth in the following Table I.

TABLE 1*

| SLIT WIDTH | SLIT LENGTH | SOURCE LENGTH | SOLID ANGLE EFFICIENCY $\Omega/2\pi$ | $\Omega/2\pi$; |
|---|---|---|---|---|
| 0.05 | 1.270 | 0.635# | 0.1050 | 0.08166 |
| 0.05 | 1.270 | 1.270 | 0.09575 | 0.07447 |
| 0.02 | 1.270 | 0.635# | 0.04208 | 0.03273 |
| 0.02 | 1.270 | 1.270 | 0.03837 | 0.02984 |

*All numbers are in centimeters
The fission source is centered along the length of the slit
;Corrected for geometric shadowing.

From the foregoing it is to be noted that in general recorded particles may be protons, alpha particles, fission fragments, or other charged particles and these can be used to determine corresponding neutron induced reactions by traditional methods. Various materials may be used as solid state track recording material, such as mica, quartz, glasses, or plastic material like "MAKROFOL", "LEXAN", "CN", "Cr-39" and members of the family of polycarbonate resins, all of which are dealt with in their normal and traditional fashion.

It is further to be noted that neutron energy range can be determined over wide limits with our device, from thermal neutrons to 14 MeV and beyond, depending on neutron reactions of the fission materials that are chosen. Generally time resolution and its error will depend on rotational frequency, rotating cylinder radius, and collimator geometry involved, and again may be varied over wide ranges from the Example cited. Detection efficiency will be dependent upon neutron reaction cross-section of the fission materials, collimator geometry, fission material thickness, and track recording material efficiency, all of which again may be widely varied for particular use.

It should be particularly noted that fission material or other source deposits of various neutron energy threshold levels may be placed in the several fission material orifices of a single device to thereby allow determination not only of the time orientation of measured radiation but also of the energy distribution of its components.

It is to be understood that various geometric rearrangements might be resorted to without departing from the spirit of our invention. For example, neither the drum geometry nor a disk geometry are necessary and could be replaced with most any geometry providing collimation and relative motion between the fission material and associated recording medium.

In certain applications it may be desirable to obtain measurements with two or more time resolutions simultaneously. This can be accomplished using different rotational frequencies with the same cylinder radii or with one rotational frequency and different cylinder radii. For still other applications, it could be advantageous to rotate the cylinder discontinuously in discrete steps rather than continuously.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent, and What we claim is:

1. A radiation dosimeter apparatus, to determine especially time dependent intensity and energy spectrum of neutron burst radiation, comprising in combination:
   a first housing member rotatable relative to a second recording member said first member housing at least one means, including at least one opening, enabling radiation to enter through the said first member from a source exterior thereof, and
   a second relatively rotatable recording member mounted adjacent said first member, said second member having means for accepting solid state track recording material in rotatable alignment with said opening in the first member, and
   means for rotating said first and second members relative each other at a predetermined angular velocity such that radiation entering through the openings in the first member impinges on said solid state track recording material carried by the second members to sense radiation in a qualitative fashion and in a time oriented manner.

2. A radiation dosimeter apparatus as set forth in claim 1 further comprising:
the second member journaled within the first member, and
the first member housing at least one removable portion to enable removal of and access to said second member.

3. A radiation dosimeter apparatus as set forth in claim 1 further comprising;
a positioning plate defining at least one aperture, said positioning plate securable to said first member wherein said positioning plate aperture overlies said opening defined in the first member.

4. A radiation dosimeter apparatus as set forth in claim 3 further comprising;
at least one collimator plate defining a slot, and means to secure said collimator plate to said first member and position said slot in overlying relationship to said aperture and said opening.

5. A radiation dosimeter apparatus as set forth in claim 4 wherein said collimator plate is positioned with said slit substantially parallel to the axis of the second member.

6. A radiation dosimeter apparatus of claim 4 wherein said collimator plate has formed thereon an attaching surface configured to complement the outer peripheral surface of the first member and of the position plate to fit in immediate adjacency thereover.

7. A radiation dosimeter apparatus as set forth in claim 3 wherein said positioning plate includes an inner cylindrical annulus concentric to said aperture for positioning a secondary fission source for a solid state track recorder therein.

8. A radiation dosimeter apparatus as set forth in claim 3 wherein said first member and said positioning plate define an equal plurality of cooperating openings and apertures.

9. A radiation dosimeter apparatus of claim 3 wherein said positioning plate has formed thereon an attaching surface configured to complement the outer peripheral surface of said first member and is positioned in immediate adjacency thereto.

10. The invention of claim 9 further characterized by:
the positioning plate including an inner cylindrical annulus concentric to said aperture for positioning a secondary fission source therein and
said cylindrical annuli having secondary fission sources of different threshold levels therein.

11. A radiation dosimeter apparatus as set forth in claim 1 wherein said second member is securable about a medially positioned axial shaft coaxial to said first member.

12. A radiation dosimeter apparatus of claim 1 wherein said second member is a cylinder with ends formed with a plurality of openings to reduce inertial mass of said second member.

13. A radiation dosimeter apparatus to determine time orientated energy spectrum of burst type neutron radiation, comprising, in combination:
a first housing cylinder defining plural, spaced, vertically aligned apertures in its cylindrical wall and having a releasably positioned cover to define a chamber, said cylinder further having
a positioning plate defining the same number of openings as the housing cylinder apertures and secured to the outer surface of said first housing cylinder with openings overlying said first cylinder apertures, and an annulus concentric about each opening for positioning a secondary fission source,
plural collimator plates defining slits secured to said housing cylinder in overlying relationship to said apertures and said openings and
plural secondary fission source elements carried in each annulus associated with each positioning plate opening;
a second recording cylinder mounted on an axis coincident with the axis of the first housing cylinder, said second cylinder having
a low inertial mass and a peripheral surface spaced inwardly adjacent the inner surface of the first cylinder with
the peripheral surface having means of releasably attaching concentric bands of solid state track recording material in rotatable alignment with each of the apertures in the first cylinder; and
means for rotating said second cylinder at predetermined angular velocity relative to said first cylinder.

14. The invention of claim 13 further characterized by:
said second recording cylinder being stationary and said first housing cylinder being rotatable.

15. The invention of claim 13 further characterized by said second recording cylinder being rotatable and said first housing cylinder being stationary.

16. A radiation dosimeter apparatus to determine time orientated energy spectrum of burst type neutron radiation, comprising, in combination:
a first disk defining plural, spaced, radially aligned apertures, said disk having
a positioning plate defining the same number of openings as the disk apertures and secured to the outer surface of said disk with said openings overlying said disk apertures, and an annulus concentric about each opening for positioning a secondary fission source,
plural collimator plates defining slits secured to said first disk in overlying relationship to said apertures and openings, and
plural secondary fission source elements carried in each annulus associated with each positioning plate opening;
a second recording disk rotatably mounted on an axis coincident with the axis of the disk, said second disk having
a surface spaced adjacent the inner surface of the first disk with
the second disk surface having means of releasably attaching concentric bands of solid state track recording material in rotatable alignment with each of the openings in the first disk; and
means for rotating said second disk at predetermined angular velocity relative to said first disk.

17. The invention of claim 16 further characterized by: said second recording disk being stationary and said first disk being rotatable.

18. The invention of claim 16 characterized by said second recording disk being rotatable and said first disk being stationary.

* * * * *